United States Patent
Kraemer et al.

(10) Patent No.: US 8,364,357 B2
(45) Date of Patent: Jan. 29, 2013

(54) SHIFTING POINT DISPLAY IN A MOTOR VEHICLE HAVING A MANUAL TRANSMISSION

(75) Inventors: Gerd Kraemer, Baierbrunn (DE); Alberto Croci, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1243 days.

(21) Appl. No.: 12/137,055

(22) Filed: Jun. 11, 2008

(65) Prior Publication Data

US 2008/0242504 A1 Oct. 2, 2008

Related U.S. Application Data

(63) Continuation of application No. PCT/EP2006/011614, filed on Dec. 4, 2006.

(30) Foreign Application Priority Data

Dec. 16, 2005 (DE) .......................... 10 2005 060 130

(51) Int. Cl.
*G06F 7/00* (2006.01)
*G06F 17/00* (2006.01)
*G06F 19/00* (2011.01)

(52) U.S. Cl. ................ 701/51; 701/52; 701/53; 701/54; 701/55; 701/56; 701/60; 701/62; 701/64; 701/65

(58) Field of Classification Search .................. None
See application file for complete search history.

(56) References Cited

U.S. PATENT DOCUMENTS

| | | | | |
|---|---|---|---|---|
| 4,041,810 A | * | 8/1977 | Harmon et al. | 477/128 |
| 4,226,295 A | * | 10/1980 | Rembold et al. | 180/335 |
| 4,411,174 A | * | 10/1983 | Yokoi et al. | 477/62 |
| 4,604,700 A | * | 8/1986 | Igarashi et al. | 701/64 |
| 4,622,637 A | * | 11/1986 | Tomita et al. | 701/64 |
| 5,477,452 A | * | 12/1995 | Milunas et al. | 701/1 |
| 6,571,164 B1 | * | 5/2003 | Henneken et al. | 701/87 |
| 2004/0225430 A1 | * | 11/2004 | Bothe et al. | 701/52 |

FOREIGN PATENT DOCUMENTS

| | | |
|---|---|---|
| DE | 29 23 986 A1 | 3/1980 |
| DE | 32 37 517 A1 | 4/1984 |
| DE | 33 34 722 C2 | 4/1985 |
| DE | 39 12 359 A1 | 10/1990 |
| DE | 694 17 813 T2 | 8/1999 |
| DE | 199 63 156 B4 | 6/2001 |

OTHER PUBLICATIONS

International Search Report dated Apr. 19, 2007 with English translation of relevant portion (Four (4) pages).
German Search Report dated Jul. 5, 2006 with English translation of relevant portion (Nine (9) pages).

* cited by examiner

*Primary Examiner* — Ian Jen
(74) *Attorney, Agent, or Firm* — Crowell & Moring LLP

(57) ABSTRACT

A shifting point display for indicating shift advice is provided in a motor vehicle having a manual transmission and a control unit for the continuous determination of a current operating point of the motor vehicle. At least one characteristic upshift indication curve or a characteristic downshift indication curve is stored in an electronic memory. An upshift indication or a downshift indication is displayed when the characteristic upshift indication curve or the characteristic downshift indication curve is reached by the current operating point and a currently differently engaged gear. The upshift indication or the downshift indication is indicated until the driver has carried out a corresponding upshift operation or downshift operation or until the current operating point has reached and/or fallen below a characteristic upshift indication hysteresis curve that is smaller than the characteristic upshift indication curve, or has reached and/or exceeded a characteristic downshift indication hysteresis curve that is greater than the characteristic downshift indication curve.

16 Claims, 3 Drawing Sheets

SHIFTING POINT DISPLAY IN A MOTOR VEHICLE HAVING A MANUAL TRANSMISSION

CROSS-REFERENCE TO RELATED APPLICATIONS

This application is a continuation of PCT International Application No. PCT/EP2006/011614, filed Dec. 4, 2006, which claims priority under 35 U.S.C. §119 to German Application No. 10 2005 060 130.8, filed Dec. 16, 2005, the entire disclosures of which are expressly incorporated by reference herein.

BACKGROUND AND SUMMARY OF THE INVENTION

The invention relates to a shifting point display in a motor vehicle having a manual transmission for providing shifting advice.

In contrast to automatic transmissions, in which the shifting operation is carried out automatically by stored characteristic upshift and downshift curves, in the case of motor vehicles having manual transmissions, the driver himself is responsible for selecting the gears. In order to make this easier for the driver, various shifting point displays are known, which inform the driver as to when he should shift in order to drive, for example, in a particularly efficient fuel consumption manner.

Thus, from German patent document DE 199 63 156 B4, an indicating instrument for a motor vehicle is known to have a display, in which case, as a function of the momentary accelerator pedal position or manual drive position, at least one characteristic engine curve stored in an electric memory is displayed. By means of this representation, the driver is supposed to recognize whether the operating point of his engine is in an optimal range and how the operating range changes when he, for example, no longer provides fuel or changes the gear. In this type of representation, the driver's attention could be excessively diverted from the driving situation because he constantly has to check, by way of the display, whether he is operating the motor vehicle in an optimal operating range.

From German patent document DE 39 12 359 A1, a shift assist advice device is known, which emits shift recommendations for a fuel-consumption-optimized and/or exhaust-pollution-minimized driving method on the basis of detected current conditions of the rotational engine speed, the driving speed, the engaged gear, the accelerator pedal position, and on the basis of engine and transmission characteristics data. This determination of the shift recommendation requires high computing capacities. Another problem occurs when the vehicle is operated in such a manner that the computed optimal gear changes constantly between the currently engaged gear and another gear. The shift advice would then toggle; that is, it would constantly change between active and inactive, which would have a disturbing effect on the driver, or may even put the driver into a state of uncertainty.

There is therefore needed an improved shifting point display, which requires no unnecessary computing capacities and does not put the driver into a state of uncertainty or disturb the driver.

This, and other, needs are met according to the invention by a shifting point display for providing shifting advice in a motor vehicle having a manual transmission and a control unit, the control unit continuously determining a current operating point of the motor vehicle. At least one characteristic upshift indication curve is stored in an electronic memory and an upshift indication is displayed when the current operating point reaches the characteristic upshift indication curve and a lower gear is currently engaged gear. The upshift is displayed until the driver has carried out an upshift operation or until the current operating point reaches and/or falls below a characteristic upshift indication hysteresis curve that is smaller than the characteristic upshift indication curve.

A second shifting point display for providing shifting advice according to the invention in a motor vehicle having a manual transmission and having a control unit for the continuous determination of a current operating point of the motor vehicle is characterized in that at least one characteristic downshift indication curve is stored in an electronic memory and a downshift is indicated when the current operating point reaches the characteristic downshift indication curve and a higher gear is currently engaged. The downshift indication is displayed until the driver has carried out a downshift operation or until the current operating point reaches and/or exceeds a characteristic downshift indication hysteresis curve that is greater than the characteristic downshift indication curve.

The two shifting point displays according to the invention, are therefore, based on characteristic upshift and downshift curves respectively, as stored in motor vehicles having automatic transmissions and used for the automatic shifting operation. In contrast to the characteristic upshift and downshift curves respectively, which are stored in the motor vehicles having an automatic transmission, the characteristic upshift indication curves and downshift indication curves, respectively, in the case of the invention are displaced relative to the above-mentioned characteristic upshift and downshift curves respectively such that, when the driver receives the shift advice, he still has sufficient time to carry out the shifting operation at the optimal point in time. This time period is taken into account when determining the characteristic upshift indication and downshift indication curves, respectively.

As a result of the output of the shift advice when the characteristic upshift indication or downshift indication curve is reached, only very low computing capacities are required because only a comparison has to be made between the characteristic shift indication curves and the current operating point of the motor vehicle.

Another advantage of the indicating devices according to the invention consists of the display, or of the duration of the display, of the respective shift advice. Since the shift advice is not canceled before the driver either has carried out the corresponding shifting operation or the current operating point of the motor vehicle has fallen below the given characteristic upshift indication hysteresis curve that is smaller than the characteristic upshift indication curve, or the operating point of the motor vehicle has exceeded the given characteristic downshift indication hysteresis curve that is greater than the characteristic downshift indication curve, a toggling of the indication is excluded. The distance between the characteristic upshift indication curve and the characteristic upshift indication hysteresis curve or between the characteristic downshift indication curve and the characteristic downshift indication hysteresis curve should be such that, on the one hand, the toggling can be excluded when the vehicle is operated approximately in one operating point and, on the other hand, the indication is no longer active when a shifting operation according to the indication no longer makes sense or is no longer possible.

The upshift advice and/or the downshift advice may be a visual indication, preferably a display, which reflects the target gear, in the instrument panel of the motor vehicle or in a separate display in the motor vehicle.

Advantageously, the relevant characteristic upshift indication curve and the pertaining characteristic upshift indication hysteresis curve and/or the relevant characteristic downshift indication curve and the pertaining characteristic downshift indication hysteresis curve are stored for all gears in the electronic memory. This means that, for the lowest gear, no characteristic downshift indication and pertaining characteristic downshift indication hysteresis curve and, for the highest gear, no characteristic upshift indication curve and pertaining characteristic upshift indication hysteresis curve are stored in the memory. However, for the gears situated in-between, a characteristic upshift indication curve, a respective characteristic upshift indication hysteresis curve, a characteristic downshift indication curve and a pertaining characteristic downshift indication hysteresis curve should be stored. Thus, the output of shift advice to the driver becomes possible over the entire operating range of the motor vehicle, when it is required.

The current operating point is advantageously determined as a function of the rotational output speed or the motor vehicle speed and the accelerator pedal angle, and the characteristic upshift indication curves and/or characteristic downshift indication curves, as well as the pertaining characteristic upshift indication hysteresis curves and/or characteristic downshift indication hysteresis curves are stored as a function of the rotational output speed or the motor vehicle speed and the accelerator pedal angle. By means of the current rotational output speed or the motor vehicle speed and the current accelerator pedal position, it can therefore be determined whether a given characteristic shift indication curve is to be reached and an output of a shift advice is to take place, or whether—if the shift advice is already active and the driver has not carried out a corresponding shifting operation—the characteristic hysteresis curve pertaining to the characteristic shift indication curve has been reached, not been reached, or exceeded.

The shifting point advice can be displayed either sequentially—thus, upward or downward by only one gear—or over several gears—thus, over several gears deviating from the current gear. If, for example, the $2^{nd}$ gear is currently engaged, a shift advice into the $6^{th}$ gear can also be displayed when the rotational speed is high. The displayed maximal gear spread may be separately limited in the upshift and downshift direction. The number of shifting operations can thereby clearly be reduced. However, a downshift advice by more than one gear is not meaningful.

In the case of several stored characteristic upshift indication curves, the upshift advice assigned to the maximum characteristic upshift indication curve reached by the operating point is advantageously displayed. Or, in the case of several characteristic downshift indication curves, downshift advice is displayed that is assigned to the maximum characteristic downshift indication curve reached by the operating point. Thus, the shift point display can also output a shift indication to a gear to be engaged that is not situated directly above or below the current gear.

Advantageously, the determination of the upshift advice and/or of the downshift advice does not take place when predetermined conditions have not been met. This means that the determination of the shifting point display is carried out only under certain conditions. These conditions may, for example, be a certain speed range which should not be exceeded or fallen below, or a predetermined rotational speed gradient that should not be exceeded. As a further condition, the vehicle should not be operated in the reverse gear and the brake should also not be depressed.

If the above-mentioned conditions have been met and a shift indication to be displayed is determined within the scope of the shifting point displays according to the invention, advantageously the upshift indication and/or the downshift indication is suppressed, however, when the motor vehicle is cornering or when the motor vehicle is in a downhill operation. The downhill operation can be determined by means of a traction resistance detecting device. Finally, the output of the shift advice does not take place before a frictional connection exists between the drive unit and the transmission.

The upshift indication is advantageously suppressed when a brake operation exists in the motor vehicle. However, the output of the downshift indication takes place when the brake is operated.

The stored characteristic curves advantageously are fuel consumption-optimal characteristic curves; that is, the characteristic curves are defined on the basis of the fuel consumption. When the driver follows the shifting advice, he can operate the motor vehicle in an extremely consumption-effective manner.

Other objects, advantages and novel features of the present invention will become apparent from the following detailed description when considered in conjunction with the accompanying drawings.

DETAILED DESCRIPTION OF THE DRAWINGS

Figure 1:
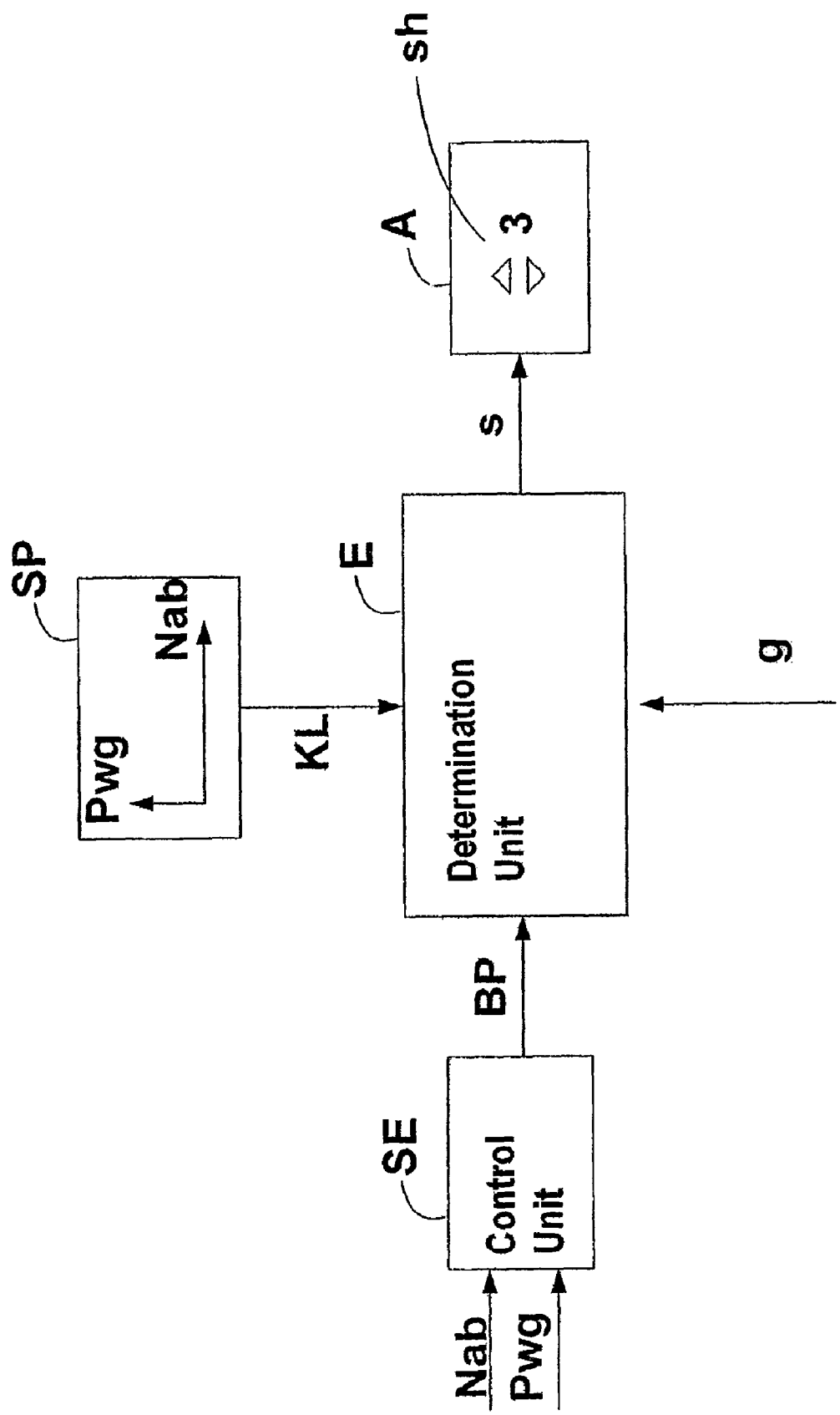
FIG. 1 is a simplified representation of the shifting point display according to the invention.

FIG. 1 illustrates a shifting point display of a motor vehicle equipped with a manual transmission for displaying shifting advice "sh". The current operating point BP of the motor vehicle is continuously determined in a control unit SE as a function of the current rotational output speed Nab or of the current speed of the motor vehicle and of the accelerator pedal angle Pwg. The continuously determined operating point BP is fed to a determination unit E, which determines a signal "s" for the output of the shift advice "sh".

Several characteristic shift indication curves KL are stored in a memory SP as a function of the rotational output speed Nab and the pedal position Pwg. These characteristic shift indication curves KL are also fed to the determination unit E. In addition, the determination unit E receives a signal "g" which reflects the currently engaged gear.

The signal s is generated in the determination unit E as a function of the input signals BP, g and KL and is fed to the display unit A. As a function of this signal s, the display unit A puts out the determined shift indication sh. In the present embodiment, the latter consists of a number, which corresponds to the gear to be engaged, and of an upward or downward oriented triangle. Depending on whether an upshift indication or a downshift indication is involved, the upward or downward oriented triangle is active and illuminated.

Figure 2:
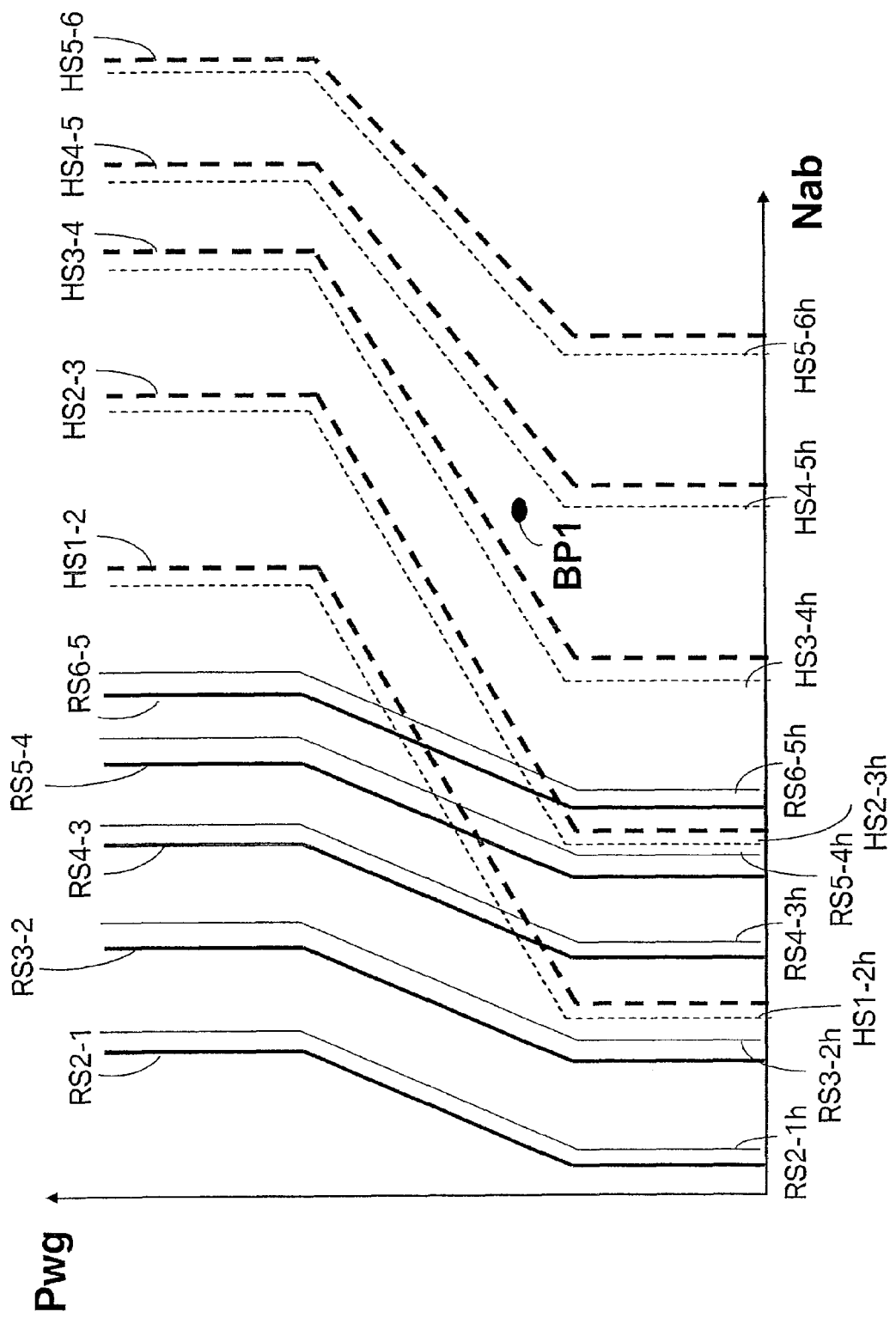
FIG. 2 is a view of stored characteristic upshift and downshift indication curves of a motor vehicle having a manual transmission with six (6) forward gear positions.

FIG. 2 is a simplified representation of stored characteristic upshift indication curves HS1-2, HS2-3, HS3-4, HS4-5 and HS5-6, characteristic upshift indication hysteresis curves HS1-2h, HS2-3h, HS3-4h, HS4-5h and HS5-6h, characteristic downshift indication curves RS2-1, RS3-2, RS4-3, RS5-4 and RS6-5, and characteristic downshift indication hysteresis curves RS2-1h, RS3-2h, RS4-3h, RS5-4h and RS6-5h, for a motor vehicle having a manual 6-gear transmission. The characteristic curves are plotted as a function of the rotational output speed Nab and of the pedal position Pwg.

FIG. 2 shows that a characteristic upshift indication hysteresis curve HS1-2h, HS2-3h, HS3-4h, HS4-5h and HS5-6h displaced to the left is assigned to each characteristic upshift indication curve HS1-2, HS2-3, HS3-4, HS4-5 and HS5-6. In contrast, the characteristic downshift indication hysteresis curves RS2-1h, RS3-2h, RS4-3h, RS5-4h and RS6-5h pertaining to the characteristic downshift indication curves RS2-1, RS3-2, RS4-3, RS5-4 and RS6-5 are displaced toward the right.

In addition, a currently determined operating point BP1 of the motor vehicle is also entered into the representation of FIG. 2. By means of the present representation, it can be recognized that the gear required for this operating point BP1 is the $4^{th}$ gear. If this gear is already engaged, no display takes place. However, if this gear is not engaged, according to the shifting point display of FIG. 1—if a lower gear is engaged—the number 4 and the upward oriented triangle would be put out. If a higher gear is engaged, no downshift advice would be put out because there was no falling below a characteristic downshift advice curve.

Figure 3:
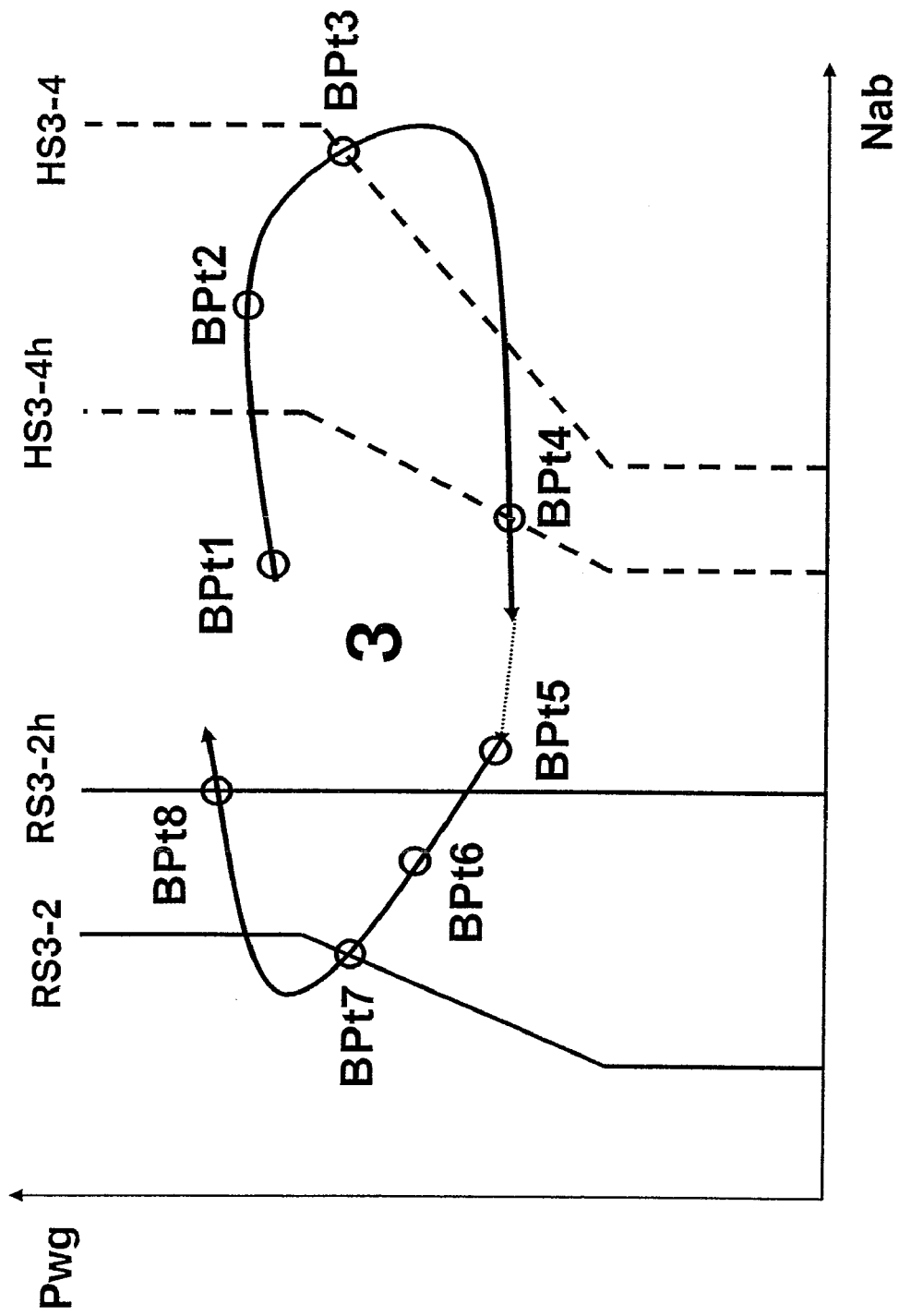
FIG. 3 is a representation which illustrates the sequence of the shifting point displays according to the invention for displaying shifting advice.

FIG. 3 indicates the sequence for displaying shifting advice carried out within the scope of the shifting point display according to the invention.

With respect to the above, FIG. 3 shows the characteristic upshift indication curve HS3-4, the reaching of this characteristic upshift indication curve having the purpose of generating an upshift indication into the $4^{th}$ gear, the pertaining characteristic upshift indication hysteresis curve HS3-4h, the characteristic downshift indication curve RS3-2, the reaching of the characteristic downshift indication curve RS3-2 having the purpose of generating a downshift indication into the $2^{nd}$ gear, and the pertaining characteristic downshift indication hysteresis curve RS3-2h. In addition, various current operating points BPt1 to BPt8 are shown, which the motor vehicle takes up at different points in time. At the current point in time, the motor vehicle is at the operating point BPt1, and the $3^{rd}$ gear is always engaged, which is to be indicated by the number 3 in FIG. 3.

It is assumed that all predefined conditions are met which lead to a meaningful display. For example, no meaningful display can be determined when the motor vehicle is in an unclear situation with respect to driving dynamics when, for example, torque intervention is carried out, or the driver's intention cannot be recognized because the accelerator pedal is not depressed. A generating or an output of an upshift or downshift indication also does not take place in the reverse gear or when the brake is applied.

In the shifting point display, it is now determined in a first step which gear corresponds to the optimal gear and where the current operating point is positioned within the characteristic curve field illustrated in FIG. 3. For this purpose, the input signals are evaluated for the determination of the current operating point of the motor vehicle. By means of the position of the current operating point within the field of characteristic curves illustrated in FIG. 3, a possible shift advice or the cancellation of a shift advice is determined. The function for determining the shift advice therefore extends parallel to the driver's gear selection.

When now, for example, the operating point BPt1 is determined to be the current operating point, it is determined by means of the positioning of the operating point BPt1 within the illustrated field of characteristic curves, that the optimal gear is the $3^{rd}$ gear because the characteristic upshift indication curve, which is arranged at the highest point and is exceeded, is the characteristic upshift indication curve HS2-3 from the $2^{nd}$ into the $3^{rd}$ gear (not shown here). By means of the comparison of the thus determined optimal gear with the currently engaged gear which, in this example, is also the $3^{rd}$ gear, it is determined that the engaged gear is already the optimal gear and an output of a shift advice therefore does not have to take place.

If the operating point BPt2 is determined to be the current operating point, the $3^{rd}$ gear is determined again to be the optimal gear and correspondingly no output of a shift advice takes place as a result of a comparison with the currently engaged gear.

If the operating point BPt3 is determined to be the current operating point, the system recognizes that the characteristic upshift indication curve HS3-4 has been reached and the output of an upshift indication may possibly have to take place if the current gear is lower than the $4^{th}$ gear. As a result of a comparison, it is determined that the engaged gear is lower than the $4^{th}$ gear. The output of an upshift advice therefore takes place at operating point BPt3.

If the operating point BPt4 is determined to be the current operating point, the system recognizes that the characteristic upshift indication hysteresis curve HS3-4h has been reached and the upshift indication therefore has to be deactivated if the vehicle is operated in the $3^{rd}$ gear, which is again determined by a comparison. In the present example, the upshift indication is therefore canceled.

Next, the operating point BPt5 is determined as the current operating point, and the $3^{rd}$ gear is therefore again determined to be the optimal gear. Corresponding to the operating points BPt1 and BPt2, a shift indication also does not take place here. The same applies to operating point BPt6 as to operating point BPt5 since neither the characteristic upshift indication curve HS3-4 nor the characteristic downshift indication curve RS3-2 was exceeded or not reached.

It is not determined before operating point BPt7 that the characteristic downshift indication curve RS3-2 has been reached and a downshift indication therefore has to be put out if a higher gear than the $2^{nd}$ gear is engaged. As a result of the comparison of the determined optimal gear and the currently engaged gear, a downshift indication is put out because the currently engaged gear is higher than the $2^{nd}$ gear.

In operating point BPt8, it is determined that the characteristic downshift indication hysteresis curve RS3-2h has been reached. Since the downshift indication is still active and is therefore put out, and the current gear is the $3^{rd}$ gear, the downshift indication is deactivated again.

In addition to the above-mentioned prerequisites which have to be present so that a shift indication is even generated, limitations could also exist with respect to the output of a determined shift indication. Thus, it may happen under certain conditions that, for example, although a shift indication is determined, its output does not take place.

A shift indication could, for example, be suppressed if, during an upshift operation corresponding to the determined gear, the maximally possible rotational connection speed or the maximally possible wheel torque were exceeded.

Also during an uphill drive or a downhill drive, the shift indication has to be adapted to the changed tractive resistances. For this purpose, the increased tractive resistance is determined first. This takes place by a comparison of the current drive torque with an average drive torque in a plane without increased tractive resistances. In order to be able to supply reliable information here also in the event of an acceleration, the current drive torque is reduced by the dynamic torques for the acceleration and the deceleration. When an increased tractive resistance is detected, the gear display can be limited as a function thereof. In this case, it should be taken into account that, even uphill, a constant drive with a slight excess torque is still conceivable by means of the gear displayed to be maximal. The possibility exists of indicating the limitation physically or by means of a characteristic curve. During a downhill drive, however, there should preferably by no output of the upshift indication starting at a certain slope because otherwise the motor vehicle may possibly become faster automatically.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for providing shifting indicators in a motor vehicle having a manual transmission and a control unit for determining a current operating point of the motor vehicle, the system comprising:
   an electronic memory having stored therein at least one characteristic upshift indication curve;
   a determination unit that outputs an upshift indication when the current operating point of the motor vehicle reaches the characteristic upshift indication curve; and
   wherein the upshift indication is output to a driver until the earlier operation of the driver carrying out an upshift operation or the current operating point at least one of reaching and falling below both a characteristic upshift indication hysteresis and the characteristic upshift indication curve.

2. A system for providing shifting indicators in a motor vehicle having a manual transmission and a control unit for determining a current operating point of the motor vehicle, the system comprising:
   an electronic memory having stored therein at least one characteristic downshift indication curve;
   a determination unit that outputs a downshift indication when the current operating point of the motor vehicle reaches the characteristic downshift indication curve; and
   wherein the downshift indication is output to a driver until the earlier operation of the driver carrying out a downshift operation or the current operating point at least one of reaching and exceeding above both a characteristic downshift indication hysteresis and the characteristic downshift indication curve.

3. A system for providing shifting indicators in a motor vehicle having a manual transmission and a control unit for determining a current operating point of the motor vehicle, the system comprising:
   an electronic memory having stored therein at least one characteristic upshift indication curve and at least one characteristic downshift indication curve;
   a determination unit that outputs an upshift indication when the current operating point of the motor vehicle reaches the characteristic upshift indication curve and outputs a downshift indication when the current operating point reaches the characteristic downshift indication curve;
   wherein the upshift indication is output to a driver until the earlier operation of the driver carrying out an upshift operation or the current operating point at least one of reaching and falling below both a characteristic upshift indication hysteresis and the characteristic upshift indication curve; and
   wherein the downshift indication is output to the driver until the earlier operation of the driver carrying out a downshift operation or the current operating point at least one of reaching and exceeding above both a characteristic downshift indication hysteresis curve and the characteristic downshift indication curve.

4. The system according to claim 3, wherein at least one of the characteristic upshift indication curve and a pertaining characteristic upshift indication hysteresis curve, and the characteristic downshift indication curve and a pertaining characteristic downshift indication hysteresis curve, is stored in the electronic memory for more than one gear of the motor vehicle.

5. The system according to claim 3, wherein the current operating point is determined as a function of a rotational output speed and a load signal.

6. The system according to claim 5, wherein the at least one of the characteristic upshift indication curve and the characteristic downshift indication curve is stored as a function of the rotational output speed and the load signal.

7. The system according to claim 1, wherein the upshift indication is indicated only up to a predefined gear difference between a current gear and an optimal gear for the motor vehicle determined from the current operating point, wherein the predefined gear difference is, at a minimum, one gear.

8. The system according to claim 3, wherein, for several stored characteristic upshift indication curves, an upshift indication is displayed that is assigned to a maximally reached characteristic upshift indication curve, or wherein for several stored characteristic downshift indication curves, a downshift indication is displayed that is assigned to a maximally reached characteristic downshift indication curve.

9. The system according to claim 3, wherein at least one of the upshift indication and the downshift indication is suppressed when the motor vehicle is in one of a: downhill operation, cornering, non-frictional connection between a drive unit and the transmission of the vehicle, and an engaged reverse gear of the vehicle.

10. The system according to claim 3, wherein the upshift indication is suppressed when a brake of the vehicle is operated.

11. The system according to claim 3, wherein at least one of the characteristic upshift indication curve and the characteristic downshift indication curve is based upon an optimal fuel consumption characteristic.

12. A method for providing a shift indication to a driver of a motor vehicle having a manual transmission, the method comprising the acts of:
   storing, in the vehicle, at least one characteristic upshift indication curve, one characteristic downshift indication curve, one characteristic upshift indication hysteresis curve that is smaller than the characteristic upshift indication curve, and one characteristic downshift indication hysteresis curve that is greater than the characteristic downshift indication curve;
   determining a current operating point of the vehicle;
   when the current operating point reaches one of the characteristic upshift or downshift indication curves, outputting a shifting indication to the driver; and
   maintaining the output shifting indication to the driver until the current operating point reaches or falls below both the characteristic upshift indication hysteresis curve and the characteristic upshift indication curve or the current operating point reaches or exceeds above both the characteristic downshift indication hysteresis curve and the characteristic downshift indication curve.

13. The system according to claim 1, wherein the characteristic upshift indication hysteresis curve is greater than a characteristic downshift indication curve which, upon being reached and/or exceeded by the current operating point, would cause the determination unit to output a downshift indication.

14. The system according to claim 2, wherein the characteristic downshift indication hysteresis curve is smaller than a characteristic upshift indication curve which, upon being reached and/or exceeded by the current operating point, would cause the determination unit to output an upshift indication.

15. The system according to claim 3, wherein the characteristic upshift indication hysteresis curve is greater than the characteristic downshift indication curve, and wherein the characteristic downshift indication hysteresis curve that is smaller than the characteristic upshift indication curve.

16. The method according to claim 12, wherein the characteristic upshift indication hysteresis curve is greater than the characteristic downshift indication curve, and wherein the characteristic downshift indication hysteresis curve is smaller than the characteristic upshift indication curve.

* * * * *